United States Patent
Pandit et al.

(10) Patent No.: US 11,677,699 B2
(45) Date of Patent: Jun. 13, 2023

(54) COGNITIVE PRE-LOADING OF REFERENCED CONTENT IN ELECTRONIC MESSAGES

(71) Applicant: INTERNATIONAL BUSINESS MACHINES CORPORATION, Armonk, NY (US)

(72) Inventors: Sushain Pandit, Austin, TX (US); Martin Oberhofer, Bondorf (DE); Ivan M. Milman, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 378 days.

(21) Appl. No.: 16/208,311

(22) Filed: Dec. 3, 2018

(65) Prior Publication Data
US 2020/0175115 A1  Jun. 4, 2020

(51) Int. Cl.
| | |
|---|---|
| G06F 16/00 | (2019.01) |
| H04L 51/18 | (2022.01) |
| G06F 16/955 | (2019.01) |
| G06F 16/907 | (2019.01) |
| G06N 20/00 | (2019.01) |
| G06F 40/30 | (2020.01) |
| G06F 40/205 | (2020.01) |
| G06F 18/241 | (2023.01) |
| G06F 16/30 | (2019.01) |

(52) U.S. Cl.
CPC ............ *H04L 51/18* (2013.01); *G06F 16/907* (2019.01); *G06F 16/955* (2019.01); *G06F 18/241* (2023.01); *G06F 40/205* (2020.01); *G06F 40/30* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 7,194,514 B1 * | 3/2007 | Yen | H04L 51/063 709/206 |
| 7,356,544 B2 | 4/2008 | Giunta | |

(Continued)

OTHER PUBLICATIONS

"Resource Hints, W3C Working Draft," [online] Copyright © 2018 W3C® (MIT, ERCIM, Keio, Beihang), Jan. 15, 2018, Retrieved from the Internet: <https://www.w3.org/TR/resource-hints/>, 14 pg.

*Primary Examiner* — Polina G Peach
(74) *Attorney, Agent, or Firm* — Cuenot, Forsythe & Kim, LLC

(57) ABSTRACT

Cognitive pre-loading of referenced content in electronic mail (e-mail) messages includes determining, using computer hardware, metadata for an electronic message directed to a user, detecting, using the computer hardware, a universal resource locator (URL) within a body portion of the electronic message, determining, using the computer hardware, a content type for the URL, and performing, using the computer hardware, natural language processing on the electronic message to determine an action importance corresponding to the URL. At least a portion of content specified by the URL can be pre-fetched from a data processing system based on the metadata, the content type of the URL, and the action importance. The electronic message and at least a portion of the content can be provided to a client device of the user.

20 Claims, 9 Drawing Sheets

(56) References Cited

U.S. PATENT DOCUMENTS

| | | | | |
|---|---|---|---|---|
| 8,069,215 B2* | 11/2011 | Jennings | ............... | G06Q 10/107 709/217 |
| 8,078,625 B1* | 12/2011 | Zhang | ................... | G06F 16/353 707/748 |
| 8,250,009 B1* | 8/2012 | Breckenridge | ........ | G06N 20/00 706/14 |
| 8,341,245 B1* | 12/2012 | Roskind | .............. | H04L 67/5681 709/224 |
| 8,793,387 B2 | 7/2014 | Dumitru et al. | | |
| 8,984,048 B1* | 3/2015 | Maniscalco | ........... | G06F 16/951 709/201 |
| 9,275,374 B1* | 3/2016 | Mendis | ...................... | G06T 9/00 |
| 9,565,233 B1* | 2/2017 | Ozuysal | ................ | H04L 67/568 |
| 9,569,522 B2* | 2/2017 | Sreenivas Prasad | ... | H04L 67/02 |
| 9,602,619 B1* | 3/2017 | Eldawy | ............... | H04L 67/2847 |
| 9,628,419 B2 | 4/2017 | Borenstein et al. | | |
| 10,554,599 B2* | 2/2020 | Weinig | ................... | H04W 4/12 |
| 2002/0133633 A1* | 9/2002 | Kumar | ................ | G06F 16/9558 707/E17.112 |
| 2004/0260776 A1* | 12/2004 | Starbuck | ................. | G06F 16/30 709/206 |
| 2007/0168430 A1* | 7/2007 | Brun | ..................... | G06Q 10/107 709/206 |
| 2010/0281224 A1 | 11/2010 | Ho et al. | | |
| 2012/0149346 A1* | 6/2012 | Akhtar | ..................... | H04W 72/04 455/414.2 |
| 2012/0151380 A1* | 6/2012 | Bishop | ................ | G06Q 10/107 715/752 |
| 2012/0245925 A1* | 9/2012 | Guha | .................. | G06F 40/237 704/9 |
| 2012/0296954 A1* | 11/2012 | Lyle | ........................ | H04L 51/04 709/202 |
| 2013/0036344 A1* | 2/2013 | Ahmed | .............. | G06F 16/9535 715/205 |
| 2013/0086197 A1* | 4/2013 | Ho | ..................... | H04L 67/2847 709/212 |
| 2013/0159408 A1* | 6/2013 | Winn | ..................... | G06N 20/00 709/204 |
| 2013/0226837 A1* | 8/2013 | Lymberopoulos | ......................... | G06F 16/9574 706/12 |
| 2013/0333026 A1* | 12/2013 | Starink | ............... | G06F 16/9558 726/22 |
| 2014/0181216 A1 | 6/2014 | Liebmann et al. | | |
| 2014/0214404 A1* | 7/2014 | Kalia | ..................... | G06F 40/40 704/9 |
| 2014/0254379 A1* | 9/2014 | Sampath | .............. | H04N 21/643 370/235 |
| 2015/0012600 A1* | 1/2015 | Chakra | ................... | H04L 51/18 709/206 |
| 2015/0295874 A1* | 10/2015 | Virtanen | ................. | H04L 51/14 709/206 |
| 2015/0350259 A1* | 12/2015 | Garg | ..................... | G06Q 10/10 709/203 |
| 2015/0356196 A1* | 12/2015 | Sreenivas Prasad | . | G06F 16/285 707/740 |
| 2016/0156732 A1* | 6/2016 | Chen | .................. | H04L 67/5681 709/206 |
| 2016/0182417 A1* | 6/2016 | Cordes | ................... | H04L 51/08 709/206 |
| 2016/0196013 A1* | 7/2016 | Gärdenfors | ........... | G06F 3/0482 715/781 |
| 2016/0337283 A1* | 11/2016 | Sadhvani | ............ | G06F 3/04847 |
| 2017/0126606 A1* | 5/2017 | Hull | ....................... | H04L 51/046 |
| 2017/0193349 A1* | 7/2017 | Jothilingam | ........... | G06N 20/20 |
| 2017/0272525 A1* | 9/2017 | Bhagwan | .............. | G06Q 30/02 |
| 2018/0018332 A1* | 1/2018 | Diaz | ................. | G06F 16/24578 |
| 2018/0253659 A1* | 9/2018 | Lee | ........................ | H04L 51/42 |
| 2019/0007426 A1* | 1/2019 | Bergström | .............. | G06F 21/53 |
| 2019/0230186 A1* | 7/2019 | Yellin | ................. | G06F 9/44505 |
| 2019/0319905 A1* | 10/2019 | Baggett | ................ | H04L 51/212 |
| 2020/0142715 A1* | 5/2020 | Moore | ..................... | G06F 9/452 |
| 2020/0374251 A1* | 11/2020 | Warshaw | ................. | H04L 51/14 |

\* cited by examiner

500

| Content | Always | Must | Should | Could |
|---------|--------|------|--------|-------|
| Music   | -      | N    | N      | N     |
| Text    | Y      | NA   | NA     | NA    |
| Video   | -      | Y    | Y      | N     |

| Content | Always | Must | Should | Could |
|---------|--------|------|--------|-------|
| Music   | -      | N    | N      | N     |
| Text    | Y      | NA   | NA     | NA    |
| Video   | -      | Y    | Y      | N     |
| Blogs   |        |      |        |       |
| Twitter |        |      |        |       |

FIG. 6

COGNITIVE PRE-LOADING OF REFERENCED CONTENT IN ELECTRONIC MESSAGES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to electronic messaging and, more particularly, to pre-loading content referenced within electronic messages.

Electronic mail (e-mail) is the primary means of communication for many people. E-mail is used not only as a vehicle for composing and sending original messages, but also for sharing content with the recipients of the electronic messages. For example, many people send electronic messages that include universal resource locators (URLs) or hyperlinks that reference content such as videos, podcasts, blogs, community websites, and the like. In many cases, the primary purpose for sending an electronic message is not to provide the user with text contained in the body portion of the electronic message, but rather to make the recipient aware of the content referenced by the URL within the electronic message.

To consume the content referenced by the URL, the recipients of the electronic message must leave the context of the e-mail client application. This requires the user to take additional steps to retrieve the content. Further, the user's device must expend additional computational resources to perform additional work such as retrieving the content referenced by the URL from a data processing system (e.g., a remote data processing system), launching an additional program such as a browser, a media player, or an additional tab in a browser to present the content, and then render the content. While the user's time and the computational resources needed to deal with a single electronic message in this manner may not be significant, when extrapolated over hours, days, or weeks, significant user time and computational resources are expended unnecessarily.

SUMMARY

In one or more embodiments, a method includes determining, using computer hardware, metadata for an electronic message directed to a user, detecting, using the computer hardware, a universal resource locator (URL) within a body portion of the electronic message, determining, using the computer hardware, a content type for the URL, performing, using the computer hardware, natural language processing on the electronic message to determine an action importance corresponding to the URL, pre-fetching, using the computer hardware, at least a portion of content specified by the URL from a data processing system based on the metadata, the content type of the URL, and the action importance, and providing the electronic message and the at least a portion of the content to a client device of the user.

In one or more embodiments, a system includes a processor configured to initiate executable operations. The executable operations include determining metadata for an electronic message directed to a user, detecting a URL within a body portion of the electronic message, determining a content type for the URL, performing natural language processing on the electronic message to determine an action importance corresponding to the URL, pre-fetching at least a portion of content specified by the URL from a data processing system based on the metadata, the content type of the URL, and the action importance, and providing the electronic message and the at least a portion of the content to a client device of the user.

In one or more embodiments, a computer program product includes a computer readable storage medium having program code stored thereon. The program code is executable by a processor to initiate executable operations. The executable operations include determining metadata for an electronic message directed to a user, detecting a URL within a body portion of the electronic message, determining a content type for the URL, performing natural language processing on the electronic message to determine an action importance corresponding to the URL, pre-fetching at least a portion of content specified by the URL from a data processing system based on the metadata, the content type of the URL, and the action importance, and providing the electronic message and the at least a portion of the content to a client device of the user.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 5 illustrates user-specified pre-fetch preferences according to an embodiment of the present invention.

FIG. 6 illustrates user-specified pre-fetch preferences according to another embodiment of the present invention.

DETAILED DESCRIPTION

Figure 1:
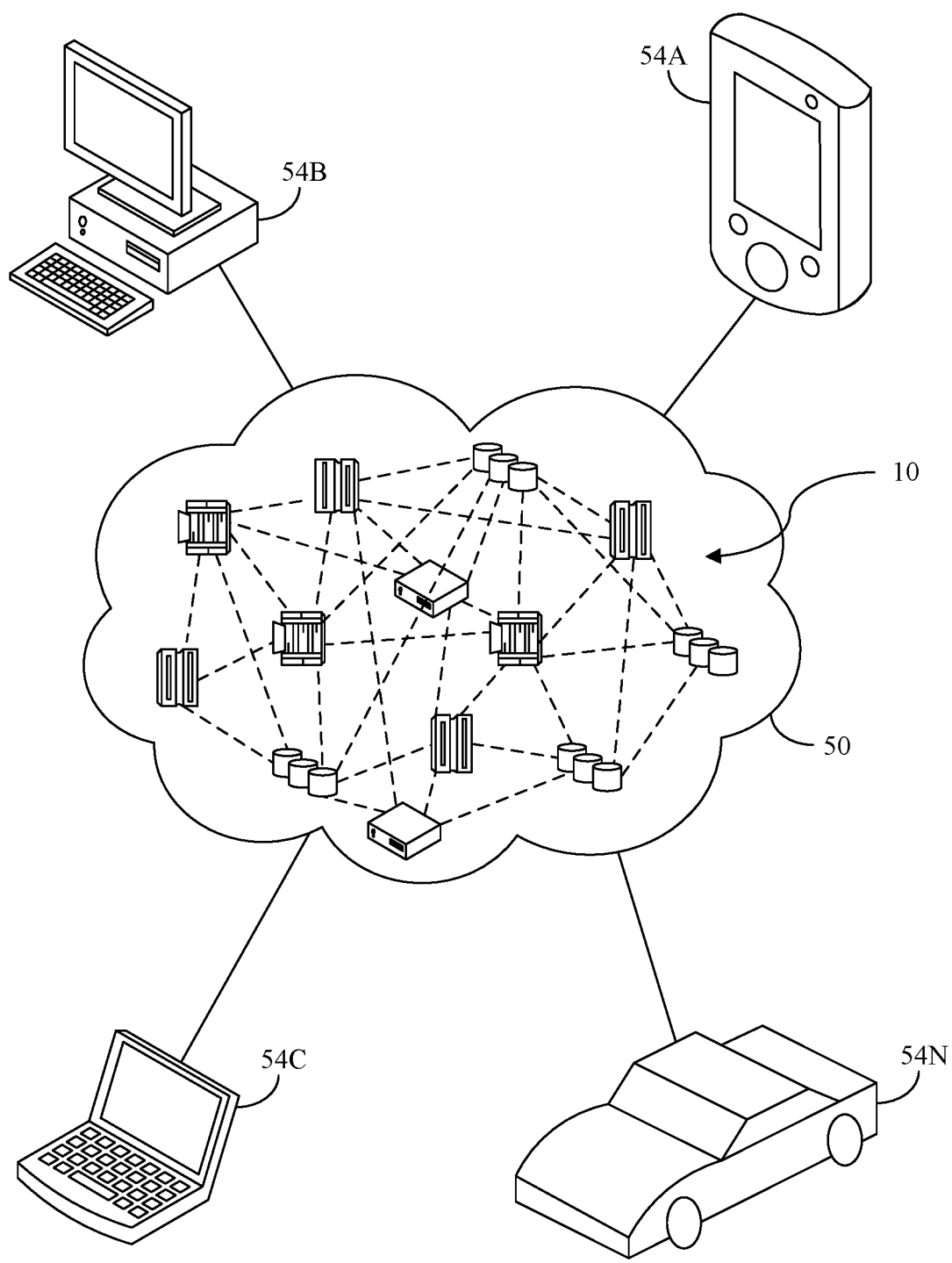
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to electronic messaging and, more particularly, to pre-loading content referenced within electronic messages. In accordance with the inventive arrangements disclosed herein, a system is capable of analyzing various aspects of electronic messages to determine whether to retrieve content referenced within the electronic messages by a universal resource locator (URL). The URL, for example, may be presented within the electronic message as a hyperlink. The system is capable of applying a cognitive process to make an intelligent determination whether to pre-load the content. In the case where the content is pre-loaded, the system is capable of providing the content to a recipient with the electronic message directed to the recipient.

In one or more embodiments, the system is capable of analyzing various aspects of electronic messages such as metadata of the electronic messages, performing Natural Language Processing (NLP) on the electronic messages, and determining a type of content referenced by the URL. The system is capable of performing NLP on the electronic messages to determine semantic content of electronic messages including the meaning of verbiage that is near and/or descriptive of the content of the URL. The system is capable of generating a feature vector specifying the various features determined from the foregoing analysis. The system, which may be implemented or included in a messaging server, is capable of training a machine learning model to operate on the feature vector to determine whether to pre-fetch the content referenced by the URL. For example, the machine learning model is capable of classifying the electronic message based on the electronic message's feature vector. The classification result indicates whether the system is to pre-load the content referenced by the URL so that the system can provide the content with the electronic message to the recipient.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
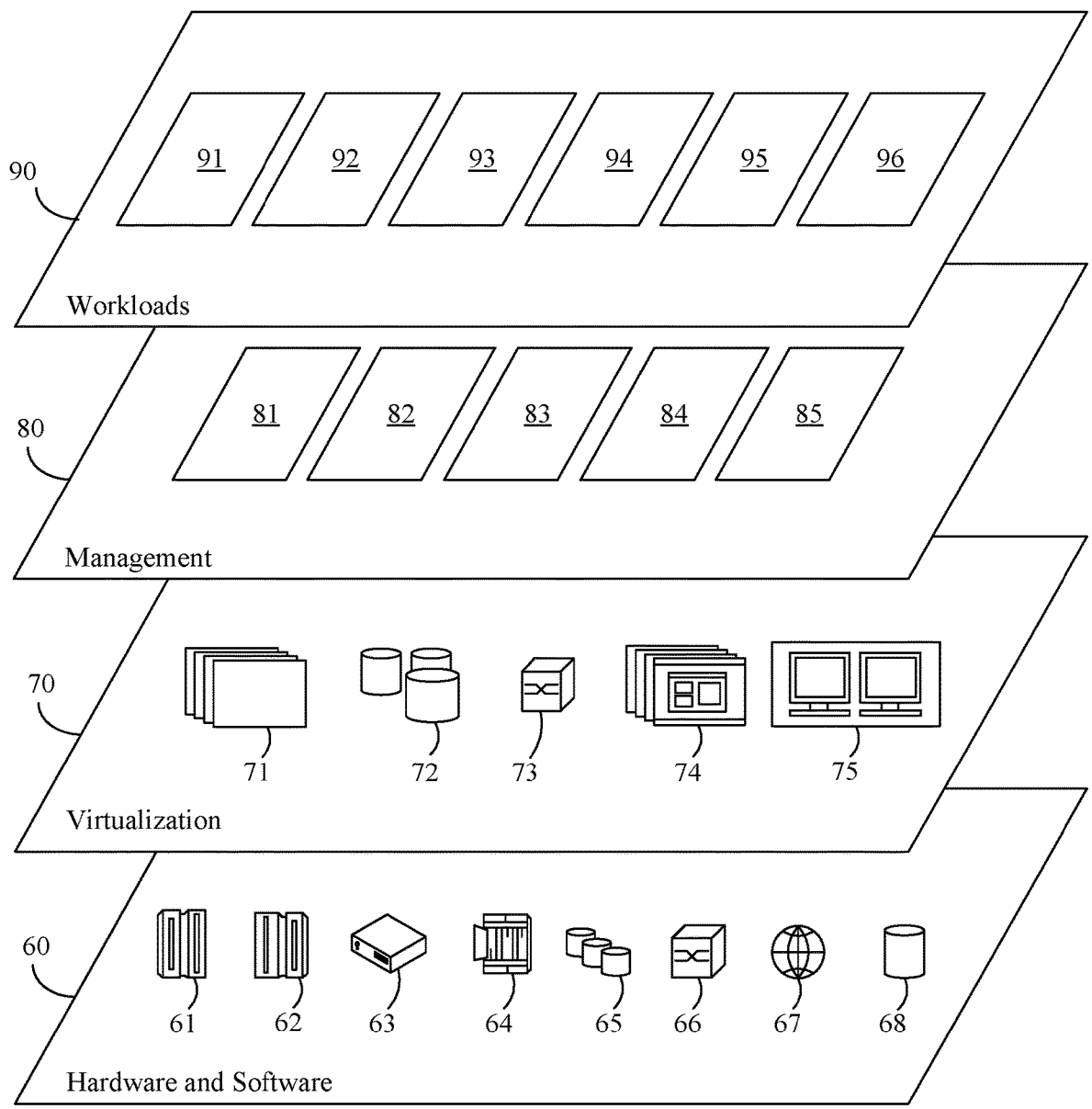
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive electronic messaging pre-loading system (system) 96.

In one or more embodiments, system 96 is implemented within and/or used by an electronic messaging server. Examples of electronic messaging servers include electronic mail servers, text messaging servers, instant messaging servers, chat messaging servers, synchronous electronic messaging servers, asynchronous electronic messaging servers, and/or other communication systems. System 96 is capable of analyzing electronic messages to detect electronic messages that include content referenced by a URL. Examples of electronic messages include any of the various types of electronic messages exchanged among devices by the example electronic messaging servers described. Examples of electronic messages include, but are not limited to, electronic mail messages, text messages, instant messages, chat messages, synchronous messages, and/or asynchronous messages. For those electronic messages that include a URL, system 96 is capable of intelligently deciding whether to pre-load the content referenced by the URL. In cases where system 96 does pre-load the content, the system is capable of providing the electronic message and the pre-loaded content to a client device (e.g., a device executing an electronic messaging client application or a browser-based electronic messaging client application) of a recipient of the electronic message. Within this disclosure, the terms "pre-fetch" and "pre-load" are used interchangeably. As used herein, the term "pre-fetch" means retrieving content referenced within an electronic message so that the content or a portion thereof can be provided or sent with the electronic message to a client device of a recipient.

System 96 is capable of analyzing various aspects of electronic messages such as the metadata of the electronic messages, results from processing the electronic messages through NLP, and a content type for the URLs included in the electronic messages (e.g., a type of the content referenced by the URLs). System 96 is capable of classifying the electronic messages where each resulting classification indicates whether content referenced by the URLs is to be pre-loaded or pre-fetched. In particular embodiments, the system uses a machine learning model to perform the classification. System 96 is capable of retraining the machine learning model in response to detecting a divergence, e.g., a mismatch, between classifications generated by the machine learning model and pre-fetch preferences defined by the recipient of the electronic message and user feedback.

Figure 3:
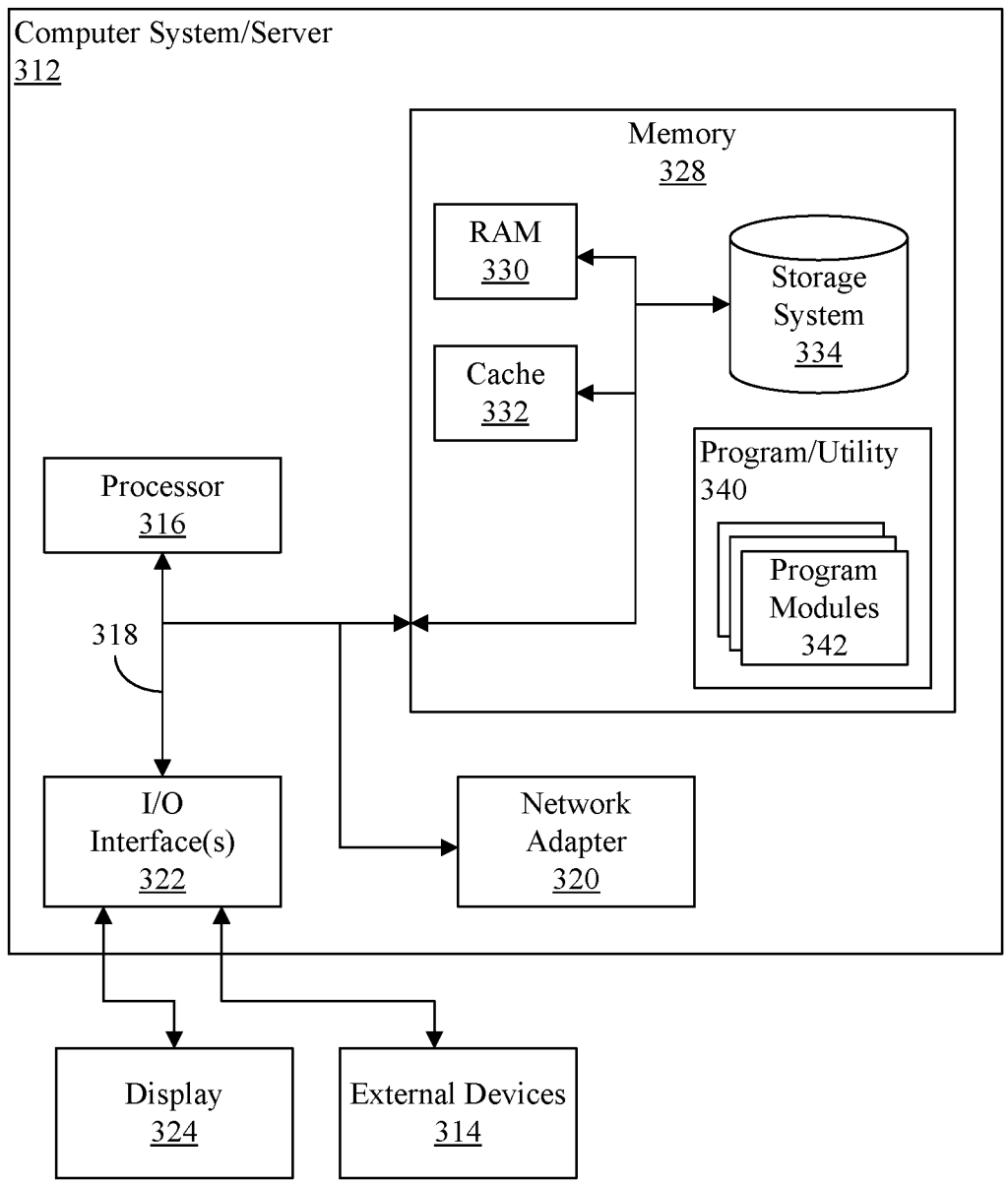
FIG. 3 depicts a cloud computing node according to an embodiment of the present invention.

FIG. 3 illustrates a schematic of an example cloud computing node 300. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 300 is shown in the form of a general-purpose computing device. The components of computer system/server 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI express (PCIe) bus.

Computer system/server 312 typically includes a variety of computer system readable media. Such media may be any available media that is accessible by computer system/server 312, and can include both volatile and non-volatile media, and removable and non-removable media.

Memory 328 can include computer system readable media in the form of volatile memory, such as random access memory (RAM) 330 and/or cache memory 332. Computer system/server 312 may further include other removable/non-removable, volatile/non-volatile computer system storage media. By way of example, storage system 334 can be provided for reading from and writing to a non-removable, non-volatile magnetic media and/or solid-state drive (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

For example, one or more of the program modules implement system 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

While node 300 is used to illustrate an example of a cloud computing node, it should be appreciated that a computer system using an architecture the same as or similar to that shown in FIG. 3 may be used in a non-cloud computing implementation to perform the various operations described herein. In this regard, the example embodiments described herein are not intended to be limited to a cloud computing environment. Node 300 is also an example of a data processing system. As defined herein, the term "data processing system" means one or more hardware systems configured to process data, each hardware system including at least one processor programmed to initiate executable operations and memory.

Node 300 is also an example of a server. As defined herein, the term "server" means a data processing system configured to share services with one or more other data processing systems. For example, the server may be an electronic messaging server configured to share services with one or more client devices (e.g., electronic messaging client devices). As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

Figure 4:
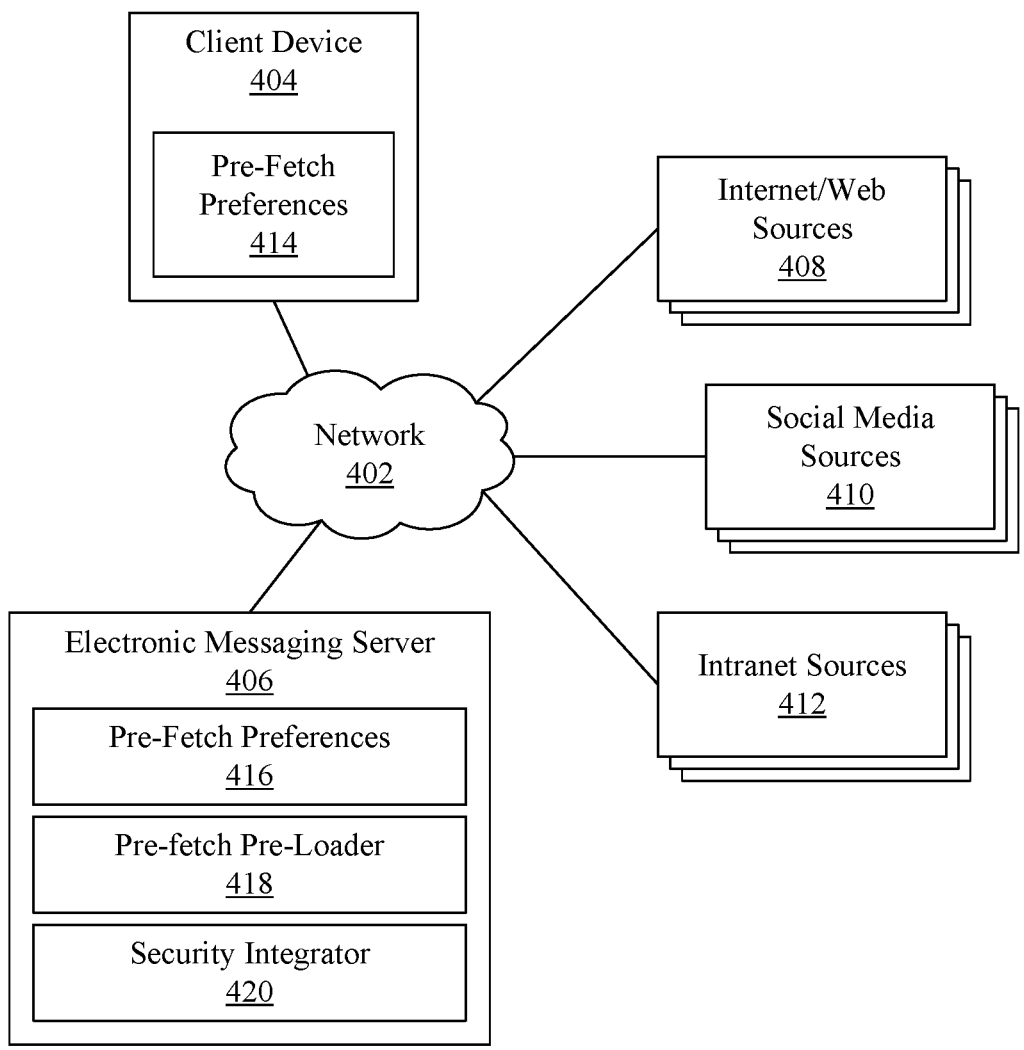
FIG. 4 illustrates a network computing system according to an embodiment of the present invention.

FIG. 4 illustrates a network computing system 400 according to an embodiment of the present invention. Network computing system 400 contains a network 402, an electronic messaging server 404, a client device 406, and one or more information sources such as Internet/Web sources 408, social media sources 410, and/or Intranet sources 412. The noted elements are interconnected, e.g., communicatively linked, by network 402.

Network 402 is the medium used to provide communication links between various devices and data processing systems connected together within network computing system 400. Network 402 may include connections, such as wired communication links, wireless communication links, or fiber optic cables. Network 402 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

Client device 404 is capable of executing client software (not shown). The client software may be a rich, full-featured featured electronic messaging application or a browser-based electronic messaging application. In one or more embodiments, client device 404 stores pre-fetch preferences 414 in memory therein. Pre-fetch preferences 414 are user defined rules, e.g., user-specific rules, for pre-fetching different types of content. Pre-fetch preferences 414 can be stored as part of the client software executed by client device 404. In one or more other embodiments, pre-fetch preferences may be stored in electronic messaging server 406 instead of within client device 404.

Electronic messaging server 406 is implemented as one or more computer systems. In one or more embodiments, electronic messaging server 406 is implemented as or within node 300 as described in connection with FIG. 3. Electronic messaging server 406 is capable of storing incoming electronic messages for distribution to client devices and sending or providing outgoing electronic messages to such client devices. Electronic messaging server 406 utilizes a client-server application model to send and receive electronic messages.

In the example of FIG. 4, electronic messaging server 406 includes an example implementation of system 96 described in connection with FIG. 2. As shown, electronic messaging server 406 includes pre-fetch preferences 416, a pre-fetch pre-loader 418, and a security integrator 420. Pre-fetch preferences 416 are user-specified pre-fetch preferences. In the example of FIG. 4, pre-fetch preferences 416 represent user-specific pre-fetch rules for one or more different users. As discussed, pre-fetch preferences for users may be stored within each respective user's client device and/or stored in electronic messaging server 406.

Pre-fetch pre-loader 418 is capable of implementing a bootstrapping and learning phase as described in greater detail in connection with FIG. 7 and a smart operation phase as described in greater detail in connection with FIGS. 8A and 8B. During the bootstrapping and learning phase, prior to accumulating sufficient data and/or user feedback for training, pre-fetch pre-loader 418 is capable of analyzing metadata for electronic messages. Examples of metadata for electronic messages include, but are not limited to, sender, title of the sender (e.g., a work or organizational title), recipients, sensitivity, and priority. Pre-fetch pre-loader 418 is also capable of analyzing electronic messages using NLP. The pre-fetch pre-loader 418 is capable of applying NLP to different portions of the electronic message such as the subject, the body, the URLs contained in the electronic message body and/or subject (e.g., if applicable), and the like. During the bootstrapping and learning phase, pre-fetch pre-loader 418 is capable of using NLP to determine a context of URLs contained in the electronic messages and whether pre-fetching of the content referenced by the URLs should be performed based on pre-fetch preferences 414 and/or 416.

The NLP analysis is capable of determining the content of the text in which URL is embedded. For example, the NLP analysis is capable of detecting keywords such as "read" and/or "review" usually indicating text to be reviewed, "watch" usually indicating a movie and/or video to be watched or looked at, and/or "listen" usually indicating a podcast or audio file to be heard. The context is useful in cases where the URL does not end with a familiar file extension indicating content type, thereby allowing the system to determine content type based on context of the text of the electronic message.

The NLP analysis is also capable of detecting additional meaning. Consider the examples of "team, please . . . " vs. "I created this for you". In the German language, there are two distinct words for "you" to indicate whether the text refers to a single person (Dich) or multiple persons (Euch). The keywords may also indicate whether processing of the linked content is mandatory or optional expressed through sentiment. For example, consider the following examples: "must read and then certify" indicating a "must" action vs. "you might find this interesting" suggesting that one may.

After operating for some time, pre-fetch pre-loader 418 is capable of learning and training a model for decision-making. Pre-fetch pre-loader 418 is capable of generating a feature vector. The feature vector can include the e-mail metadata, the URL within the electronic message, a type of the content referenced by the URL, and other NLP results from processing the electronic message. In one or more embodiments, pre-fetch pre-loader 418 generates a unique hashed value representing the URL that is used to represent the URL in the feature vector.

Pre-fetch pre-loader 418 is capable of training the model based on the feature vector or portions thereof and received user feedback. Pre-fetch pre-loader 418 is capable of receiving user feedback implicitly by monitoring user actions taken with respect to particular electronic messages about which pre-fetch pre-loader 418 has made a pre-fetch decision and/or classification and/or based on explicitly provided user feedback such as a rating or survey result judging the pre-fetch decisions made for particular electronic messages.

Once pre-fetch pre-loader 418 has trained the model, pre-fetch pre-loader 418 continues to generate feature vectors for electronic messages and applies the model to the feature vectors to determine a classification for each of the electronic messages. Pre-fetch pre-loader 418 is capable of continuing to evolve the model over time as additional user feedback is obtained relating to performance of the model in terms of deciding whether to pre-fetch content referenced by URLs in electronic messages.

In the example of FIG. 4, in cases where pre-fetch pre-loader 418 classifies an electronic message as "pre-fetch", pre-fetch pre-loader 418 is capable of accessing the content referenced by the URL in the classified electronic message from sources 408, 410, and/or 412. Sources 408, 410, and 412 are intended to represent various network connected data storage devices and/or data processing systems (e.g., websites, servers, etc.) storing content referenced by URLs found in electronic messages. It should be appreciated that the example sources shown in FIG. 4 are for purposes of illustration and not limitation. In this regard, pre-fetch pre-loader 418 is capable of accessing fewer or more sources than shown in FIG. 4 and/or different types of sources than shown in FIG. 4.

In cases where pre-fetch pre-loader 418 classifies an electronic message as "pre-fetch", pre-fetch pre-loader 418 is capable of retrieving content specified by the URL. In some cases, the URL references publicly available content that does not require any login credentials. For example, videos, podcasts, blogs, or other websites represented by sources 408 may be publicly accessible such that pre-fetch pre-loader 418 is capable of retrieving content referenced by a URL from such sources without restriction.

In other cases, the URL may reference content stored at a location that requires a user to provide credentials, e.g., login, to obtain access to the content. For example, the URL may reference content in social media sources 410 and/or Intranet sources 412 that may or may not require credentials from the user to access the content referenced by the URL. Accordingly, in one or more embodiments, security integrator 420 is capable of storing credentials for one or more different users. As such, in cases where an electronic message is classified as pre-fetch and credentials are required to retrieve the content referenced by the URL, security integrator 420 is capable of providing a user's credentials to the data source from which the content is being retrieved.

An example of a social media source 410 is a social networking system. A social networking system is implemented as one or more interconnected computer systems, e.g., servers. As defined herein, a "social networking system" is a computing platform that allows users to build social networks or social relations among people who share similar interests, activities, backgrounds or real-life connections. Through a social networking system, users may send communications through different mechanisms such as by posting messages or other media, commenting on messages, posts, or other media, replying to messages, and performing other operations such as "liking" a communication or item of media, sharing the communication and/or content, expressing an emotional sentiment, and so forth. In the context of a social networking system, actions such as posting, replying, liking, sharing, expressing sentiment, and so forth are programmatic actions that are monitored and persisted within social the networking system, e.g., within a data storage device in a data structure within and/or accessible by, the social networking system.

It should be appreciated that any of a variety of different data sources may require user credentials to retrieve content stored therein. In this regard, the use of Intranet sources and social media sources as examples where user credentials are required is only for purposes of illustration. In some cases, one or more Intranet sources and/or one or more social media sources may not require user credentials to retrieve content stored therein. Similarly, one or more web and/or Internet sources may require user credentials to obtain content stored therein.

In one or more other embodiments, security integrator 420 is capable of performing a security check on URLs contained within electronic messages that have been classified as pre-fetch. For example, security integrator 420 is capable of comparing such URLs with a list of restricted URLs that are considered unsafe. In cases where security integrator 420 determines that a URL is on the restricted list or is otherwise prohibited, the URL fails the security check. The failed security check is capable of overriding a pre-fetch classification. In that case, pre-fetch pre-loader 418 does not retrieve content referenced by any URL that fails the security check.

In one or more other embodiments, the portions of system 96 described herein may be implemented in another server that is separate from electronic messaging server 406. In that case, the server including system 96 is capable of communicating with electronic messaging server 406 to perform the operations described herein.

FIG. 5 illustrates user-specified pre-fetch preferences 500 according to an embodiment of the present invention. In the example of FIG. 5, a user has provided input to the system via their client device specifying pre-fetch preferences 500. Pre-fetch preferences 500 include a list of different types of content that may be referenced by a URL in an electronic message. Examples of different types of content shown in FIG. 5 include music, text, and video. In one example, a content type refers to a file type. For each different type of content, a user is able to specify an action importance for the content. The action importance specifies the type of handling for the corresponding content type referenced by a URL contained within an electronic message. Examples of an action importance include "always" (the content should always be retrieved), "must" (the content must be retrieved), "should" (the content should be retrieved), and "could" (the content could be retrieved). In the case where the user indicates that content is always to be retrieved, the fields to the right are marked as "NA" for not applicable. As shown, the text content type is marked as always retrieve and, as such, the columns to the right are all marked as not applicable. For the music content type, the user has indicated that music should effectively never be retrieved. For the video content type, the user has indicated that video must be retrieved and should be retrieved.

In one or more other embodiments, pre-fetch preferences 500 may specify additional electronic message processing rules that are specific to the user. Examples of such rules can include tagging or moving electronic messages from a particular sender to a junk electronic mail folder or a spam folder. Pre-fetch preferences 500 may include any of a variety of known electronic message rules (e.g., electronic mail processing rules) that may be used in combination with the content type preferences for URLs illustrated in FIG. 5.

FIG. 6 illustrates user-specified pre-fetch preferences 500 according to another embodiment of the present invention. In the example of FIG. 6, the system has added two additional content types for URLs found within electronic messages directed to the user. In response to detecting the new content types, e.g., content types not already included within user-specified pre-fetch preferences 500, the system is capable of automatically adding the content types to pre-fetch preferences 500. Once added, the system is capable of asking or querying the user to complete the preferences for the newly added content types.

Figure 7:
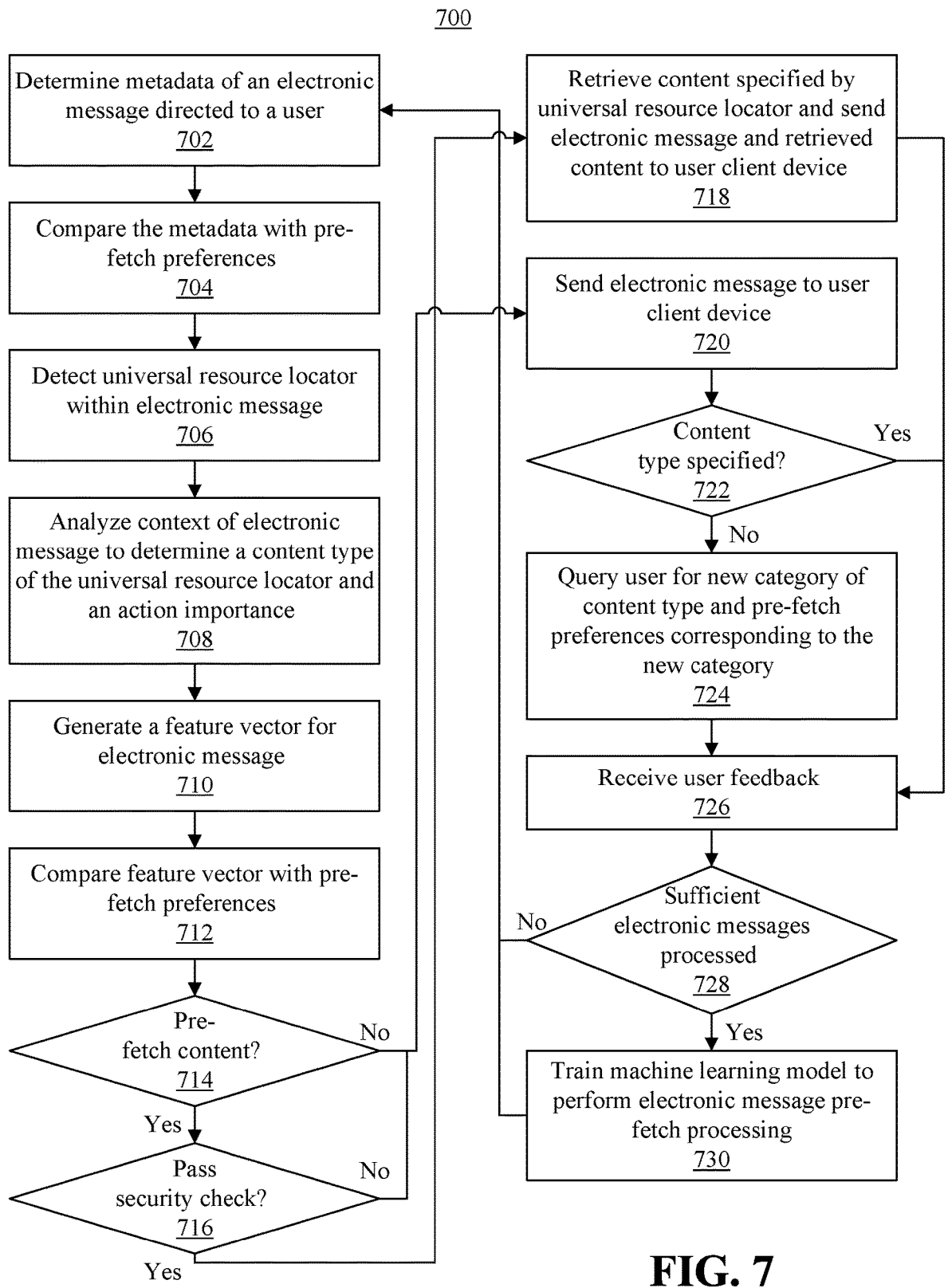
FIG. 7 illustrates a method of generating a machine learning model for pre-fetching content referenced in electronic messages according to an embodiment of the present invention.

FIG. 7 illustrates a method 700 of generating a machine learning model for pre-fetching content referenced in electronic messages according to an embodiment of the present invention. Method 700 can be performed by a system as described herein in connection with FIGS. 1-4. For example, system 96, as executed by one or more data processing nodes, e.g., node 300, is capable of performing the operations described in connection with method 700. It should be appreciated that in describing the methods illustrated in FIGS. 7, 8A, and 8B, the user referred to is a recipient of the electronic message that is being processed.

In block 702, the system determines metadata for an electronic message directed to a user. In block 704, the system is capable of comparing the metadata of the electronic message with the pre-fetch preferences specified by the user. For example, the system is capable of comparing pre-fetch preferences of the user against the metadata of the electronic message to determine whether the electronic message is one that should be processed. There may be cases, for example, where the user has established a rule that electronic messages from certain senders are to be ignored, sent to the trash, or sent to junk mail. In such cases, the system is capable of determining whether to further process the electronic message for purposes of training and/or building a machine learning model based on a comparison of the metadata of the electronic message with the pre-fetch preferences of the user. In the example of FIG. 7, the system determines that the electronic message is one that is to be further processed based upon the comparison of the metadata with the user's pre-fetch preferences.

In block 706, the system is capable of detecting one or more URLs within the electronic message. For example, the system is capable of searching and/or parsing the body of the electronic message and/or the subject of the electronic message to determine that the noted portions include one or more URLs.

In block 708, the system is capable of analyzing context of the electronic message to determine a content type of the URL and an action importance for the electronic message. For example, the system is capable of performing NLP on the electronic message. NLP is a field of computer science, artificial intelligence, and linguistics which implements computer processes to facilitate interactions between computer systems and human (natural) languages. NLP enables computers to derive computer-understandable meaning from natural language input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, and quantification information, such as cardinality, iteration, and dependency.

In one or more embodiments, the system is capable of using any of a variety of NLP libraries that are capable of detecting (e.g., annotating) text. For example, the system is capable of using an annotator that is capable of recognizing content such as blogs and/or music referenced by URLs within a corpus of text. The system is capable of using an annotator that is capable of analyzing and detecting the structure of URLs to identify the source of the URLs and/or any file or file type referenced by the URL. The annotator, for example, is capable of recognizing particular URL structures and/or file extensions (e.g., .jpg, .jpeg, .mov, .mp3, .mp4) in the URL and annotating the URL with a content type.

The system is further capable of using annotators that are configured to detect actions within a corpus of text. Examples of the actions that can be detected include, but are not limited to, review, read, listen, watch, or the like. In one or more embodiments, each action that is detectable by the system from the electronic message (e.g., review, read, listen, watch) is mapped to an action importance in the pre-fetch preferences of the user. Accordingly, upon completion of block 708, the system has identified a content type for the URL and an action importance for the electronic message.

In block 710, the system is capable of generating a feature vector for the electronic message. In one or more embodiments, the feature vector includes the determined metadata for the electronic message, a hash of the URL, a content type for the URL, and the action importance for the electronic message. In block 712, the system is capable of comparing the feature vector, or portions thereof, with the pre-fetch preferences. In particular embodiments, the system is capable of comparing the content type for the URL in the action importance for the electronic message with the user's pre-fetch preferences. At least initially, during training, the system is capable of determining that the content referenced by the URL should be pre-fetched, or retrieved, based on the user's pre-fetch preferences.

In block 716, the system determines whether to pre-fetch content specified by the URL. For example, the system is capable of determining whether to pre-fetch the content referenced by the URL based on the comparison in block 712. The system is capable of indexing into the pre-fetch preferences of the user using the determined content type of the URL and the determined action importance of the electronic message. In response to determining that the content referenced by the URL is to be pre-fetched (that the user specified a "Y" beneath "should", "could" or "would" for the content), method 700 continues to block 716. In response to determining that the content referenced by the URL is not to be pre-fetched, method 700 continues to block 720.

In block 716, the system is capable of performing a security check on the URL. In response the system determining that the URL passes the security check, method 700 continues to block 718. In response to the system determining that the URL does not pass the security check, method 700 proceeds to block 720. As discussed, in cases where the URL does not pass the security check, the system does not retrieve content specified by the URL.

In block 718, the system is capable of retrieving content specified by the URL and sending the electronic message and the retrieved content to a client device of the user. After block 718, method 700 continues to block 726. In block 720, since the content referenced by the URL is not retrieved (e.g., is not pre-fetched), the system sends the electronic message to the client device of the user.

In block 722, the system determines whether the content type determined for the URL is listed in the pre-fetch preferences of the user. In response to determining that the content type for the URL is listed in the pre-fetch preferences, method 700 continues to block 726. In response to determining that the content type of the URL is not listed in the pre-fetch preferences, method 700 continues to block 724.

In block 724, the system is capable of querying the user for a new category of content type and for pre-fetch preferences for the newly specified category of content type. The system is capable of updating the pre-fetch preferences with the new category and newly received user-specified pre-fetch preferences therefore (e.g., as shown in FIG. 6).

In block 726, the system is capable of receiving user feedback. In one aspect, the user feedback is implicit. For example, the system is capable of monitoring user activities to determine whether for pre-fetched content the user actually consumed (e.g., viewed, listened to, opened, etc.) the content and/or whether the user consumed the entirety of the content. For example, the system may detect that the user did not watch the entirety of a video or did not listen to the entirety of a portion of audio. In another example, the system is capable of monitoring user activities to determine whether the user did retrieve content that was not pre-fetched. In another aspect, the system is capable of receiving explicit user feedback. For example, the system is capable of receiving a user rating of performance of the system, receiving user sentiment relating to the performance of the system, or the like. In either case, the system is capable of storing the feedback for subsequent training of the machine learning model.

In block 728, the system determines whether a sufficient number of electronic messages have been processed for purposes of training a machine learning model. If so, method 700 continues to block 730. If not, method 700 loops back to block 702 to continue processing further electronic messages. In block 730, the system is capable of training a machine learning model to perform electronic message pre-fetch processing.

Figure 8A:
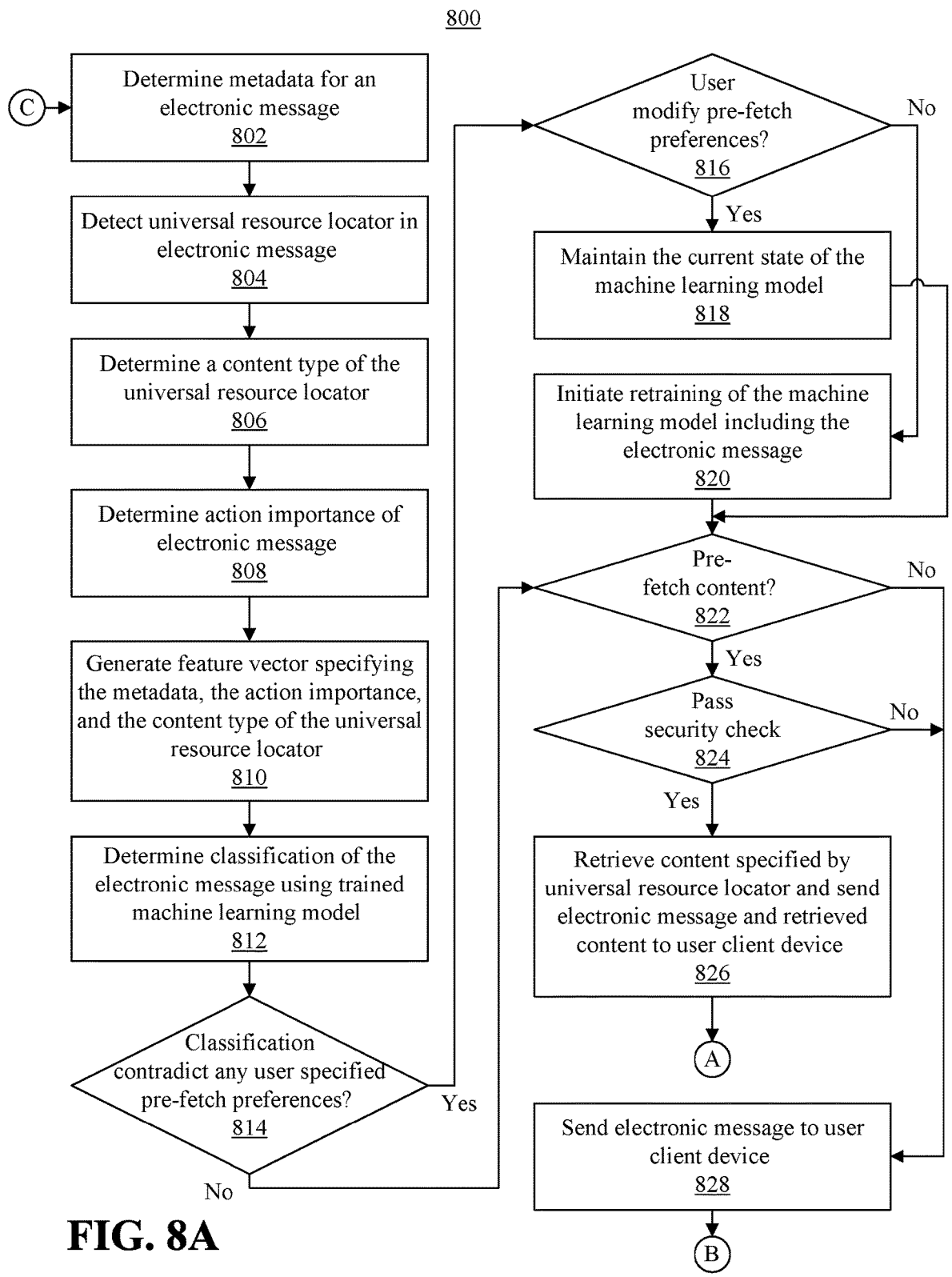
FIGS. 8A and 8B, taken together, illustrate a method of electronic message pre-fetch processing according to an embodiment of the present invention.
Figure 8B:
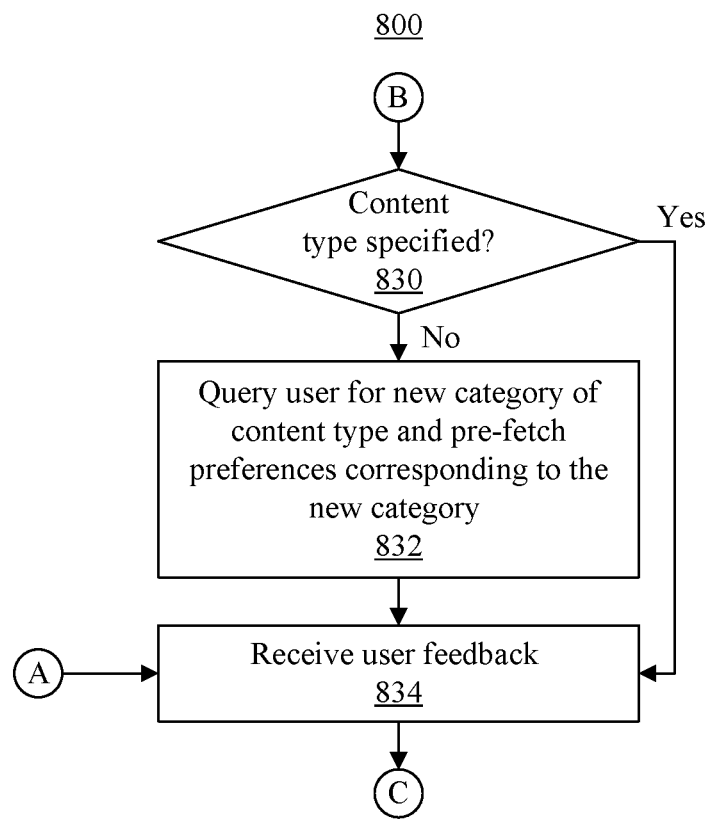

FIGS. 8A and 8B, taken together, illustrate a method 800 of e-mail pre-fetch processing in accordance with an embodiment of the present invention. Method 800 can be performed by a system as described herein in connection with FIGS. 1-4. For example, system 96, as executed by one or more data processing nodes, e.g., node 300, is capable of performing the operations described in connection with method 800. Method 800 can be performed once a machine learning model is developed, e.g., trained, as described in connection with FIG. 7.

In one or more embodiments, method 800 can begin in a state where the system has pre-screened the electronic message being processed against one or more rules (e.g., blocks 702 and 704 of FIG. 7) and determined that the electronic message should undergo pre-fetch processing. Referring to FIG. 8A, in block 802, the system determines metadata for an electronic message. In block 804, the system detects a URL within the electronic message. In block 806, the system determines a content type of the detected URL. In block 808, the system determines an action importance for the electronic message. In block 810, the system generates a feature vector specifying the metadata, the action importance, and the content type of the URL.

In block 812, the system determines a classification of the electronic message using the trained machine learning model. In the example of FIGS. 8A and 8B, the classification indicates whether content referenced by the URL should be pre-fetched. In block 814, the system determines whether the classification generated in block 812 contradicts any of the user-specified pre-fetch preferences. For example, the system determines whether the classification generated in block 812 indicates pre-fetch, while the content type and action importance in the user's pre-fetch preferences do not or vice versa. In response to determining that the classification contradicts (e.g., mismatches) the user-specified pre-fetch preferences, method 800 continues to block 816. In response to determining that the classification does not contradict user-specified pre-fetch preferences, method 800 continues to block 822.

Continuing with block 816 in the case where the classification does contradict the user-specified pre-fetch preferences, the system determines whether the user modifies the pre-fetched preferences. For example, the system is capable of notifying the user that the classification does not match the user's pre-fetch preferences and asking the user to update the user's pre-fetch preferences. In the case where the user does modify the pre-fetch preferences, method 800 continues to block 818. In the case where the user does not modify the pre-fetch preferences, method 800 continues to block 820.

In block 818, the system maintains the current state of the machine learning model since the user has updated the pre-fetch preferences. The system does not modify the existing machine learning model. After block 818, method 800 continues to block 822. In block 820, since the user did not modify the pre-fetch preferences, the system is capable of initiating retraining of the machine learning model where the retraining includes the most recent electronic message that was classified in a way that contradicted the user-specified pre-fetch preferences.

Continuing with block 822, the system determines whether the content specified by the URL is to be pre-fetched. In one aspect, the system relies on the classification to determine whether the content is to be pre-fetched. In another aspect, in the case where the classification conflicts with the pre-fetch preferences, the system is capable of performing the pre-fetch based on the pre-fetch preferences. In yet another aspect, in the case where the classification conflicts with the pre-fetched preferences, the system is capable of performing the pre-fetch based on the classification. In cases of conflict, for example, the system is capable of consulting a user-specified preference indicating the action to take in which of the classification or the user-specified pre-fetched preferences is to be followed. In any case, in response to determining that the content is to be pre-fetched, method 800 continues to block 824. In response to determining that the content is not to be pre-fetched, method 800 continues to block 828.

In block 824, the system determines whether the URL passes the security check. If so, method 800 continues to block 826, if not method 800 continues to block 828. In block 826, the system is capable of retrieving the content specified by the URL and sending the electronic message and the retrieve content, or portion thereof, to the client device of the user. After block 826, method 800 continues to block 834 of FIG. 8B. In block 828, the system is capable of sending the electronic message (e.g., only the electronic message) to the client device of the user without having retrieved the content referenced by the URL. After block 828, method 800 continues to block 830.

In block 830 in FIG. 8B, the system determines whether the content type of the URL was specified, e.g., included, in the user-specified pre-fetch preferences. If so, method 800 continues to block 832. If not, method 800 continues to block 834. In block 832, the system is capable of querying the user for a new category of content type and pre-fetch preferences corresponding to the newly specified category. The system is capable of storing the newly received data as part of the user's pre-fetch preferences. In block 834, the system is capable of receiving user feedback. The system is capable of receiving implicit user feedback and/or explicit user feedback as previously described. After block 834, method 800 is capable of looping back to block 802 to continue processing.

Not all content should be pre-fetched. Consider the case where a user gets electronic messages from a mailing list with links that the user rarely visits. It is unlikely that the user will want such content pre-fetched. By comparison, if the user gets an electronic message from the CEO talking about a "Blog post on company re-organization", the user will likely want the content referenced by the URL to be pre-fetched. The title/role of the sender and identity of the sender are captured as part of the metadata described and accounted for in the feature vector and the machine learning model.

In cases where the content requires an indication that the user reviewed the content, e.g., an audit trail mechanism, the system is capable of detecting such a mechanism from the URL. In one or more embodiments, the system is capable of retrieving the entirety of the content or a portion of the content and indicating to the user that the content requires further action such as indicating that the user has read/consumed the content. The system may also provide an indication of the length of the content in cases where only a portion of the content is retrieved to provide the user with an idea of how long review of the material will take.

Figure 9:
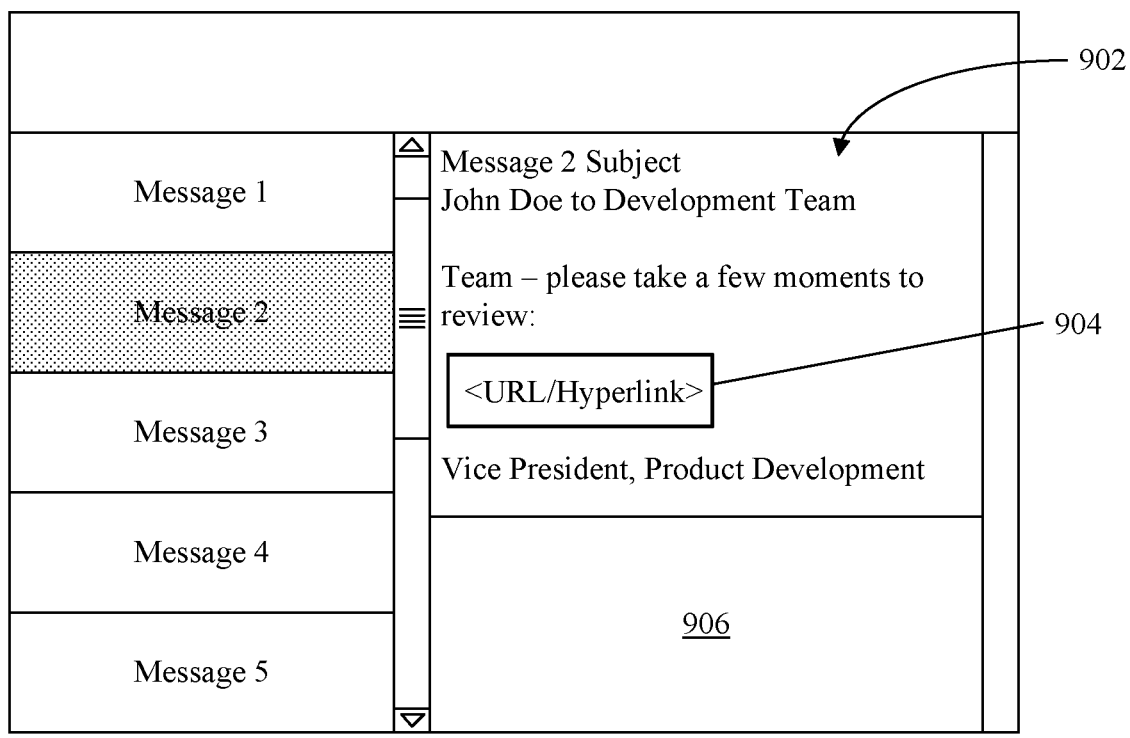
FIG. 9 illustrates an example graphical user interface for a communication client according to an embodiment of the present invention.

FIG. 9 illustrates an example graphical user interface (GUI) 900 for a client device according to an embodiment of the present invention. In the example of FIG. 9, the user's client device executes a messaging application that is capable of generating GUI 900. As pictured, GUI 900 lists a plurality of electronic messages shown as messages 1-5. Message 2 is selected and displayed in region 902. As illustrated, the body of the message includes a URL 904 (e.g., a hyperlink) to content. In this example, the system has classified the message as pre-fetch. Accordingly, the system is capable of retrieving the content specified by URL 904. The system provides the electronic message and the retrieved content (or portion thereof) to the user's client device.

In the example of FIG. 9, the retrieved content is presented automatically within region 906 of GUI 900. This allows the user to view content referenced by the URL without leaving the context of GUI 900 (e.g., the e-mail client application). In one or more other embodiments, region 906 may be displayed automatically within a separate window that is displayed alongside of GUI 900. In particular embodiments, region 906 can be displayed automatically within a pop-up style window that is displayed. It should be appreciated that content referenced by the URL may be displayed and presented to the user in any of a variety of different formats and/or visual schemes that allow the user to consume the content without leaving the e-mail client application. Further, in other embodiments, the content may not be displayed until the user provides an input requesting the rendering of the content. For example, the user can hover over or select URL 904. In another example, the system can display a button or other GUI element that is selectable and, in response to being selected, causes the user's e-mail client application to display the content.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, using computer hardware, metadata for an electronic message directed to a user;
   detecting, using the computer hardware, a universal resource locator within a body portion of the electronic message;
   determining, using the computer hardware, a content type for the universal resource locator;
   performing, using the computer hardware, natural language processing on the electronic message to determine an action importance corresponding to the universal resource locator, determining the action importance corresponding to the universal resource locator comprising detecting an action term within text of the electronic message that is distinct from the universal resource locator and mapping that action term to the action importance as specified in pre-fetch preferences of the user, the action term being an action verb and the action importance comprising an auxiliary verb indicating an importance of the action verb;
   generating a feature vector specifying the metadata for the electronic message, the content type of the universal resource locator and the action importance;
   determining a classification of the electronic message using a machine learning model, the classification indicating whether content referenced by the universal resource locator should be pre-fetched;
   determining whether the classification of the electronic message contradicts user-specified pre-fetch preferences;
   responsive to determining that the classification of the electronic message contradicts the user-specified pre-fetch preferences, determining, based on the user-specified pre-fetch preferences, whether to determine whether to pre-fetch the content referenced by the universal resource locator in accordance with the classification of the electronic message or in accordance with the user-specified preferences;
   responsive to determining whether to pre-fetch the content referenced by the universal resource locator in accordance with the classification of the electronic message, responsive to comparing the content type for the universal resource locator corresponding to the action importance with the classification of the electronic message, and responsive to classification of the electronic message indicating that universal resource locators corresponding to the action importance and with that content type are to be pre-fetched, pre-fetching, using the computer hardware, at least a portion of content specified by the universal resource locator from a data processing system based on the metadata, pre-fetching the at least a portion of the content comprising retrieving the at least a portion of the content prior to the electronic message being provided to the user; and
   providing the electronic message and the at least a portion of the content to a client device of the user.

2. The method of claim 1, further comprising:
   responsive to the determining that the classification of the electronic message contradicts the user-specified pre-fetch preferences, retraining the machine learning model using the feature vector of the electronic message.

3. The method of claim 1, further comprising:
   determining whether a sufficient number of electronic messages have been processed for purposes of training the machine learning model; and
   in response to determining that the sufficient number of electronic messages have been processed for purposes of training the machine learning model, training the machine learning model to perform electronic message pre-fetch processing.

4. The method of claim 1, further comprising:
   generating a unique hashed value representing the universal resource locator; and
   representing the universal resource locator in the feature vector using the unique hashed value.

5. The method of claim 1, further comprising:
   only retrieving the at least a portion of the content in response to performing a successful security analysis of the universal resource locator.

6. The method of claim 1, further comprising:
   in response to determining that the content type of the universal resource locator is not specified within pre-fetch preferences for the user, querying the user for a type of the universal resource locator to be included in the pre-fetch preferences.

7. A system, comprising:
   a processor configured to initiate executable operations including:
   determining metadata for an electronic message directed to a user;
   detecting a universal resource locator within a body portion of the electronic message;
   determining a content type for the universal resource locator;
   performing natural language processing on the electronic message to determine an action importance corresponding to the universal resource locator, determining the action importance corresponding to the universal resource locator comprising detecting an action term within text of the electronic message that is distinct from the universal resource locator and mapping that action term being an action verb and the action importance comprising an auxiliary verb indicating an importance of the action verb;
   generating a feature vector specifying the metadata for the electronic message, the content type of the universal resource locator and the action importance;
   determining a classification of the electronic message using a machine learning model, the classification indicating whether content referenced by the universal resource locator should be pre-fetched;
   determining whether the classification of the electronic message contradicts user- specified pre-fetch preferences;
   responsive to determining that the classification of the electronic message contradicts the user-specified pre-fetch preferences, determining, based on the user-specified pre-fetch preferences, whether to determine whether to pre-fetch the content referenced by the universal resource locator in accordance with the classification of the electronic message or in accordance with the user-specified preferences;
   responsive to determining whether to pre-fetch the content referenced by the universal resource locator in accordance with the classification of the electronic message, responsive to comparing the content type for the universal resource locator corresponding to the action importance with the classification of the electronic message, and responsive to classification of the electronic message indicating that universal resource locators corresponding to the action importance and with that content type are to be pre-fetched, pre-fetching at least a portion of content specified by the universal resource locator from a data processing system based on the metadata, pre-fetching the at least a portion of the content comprising retrieving the at least a portion of the content prior to the electronic message being provided to the user; and providing the electronic message and the at least a portion of the content to a client device of the user.

8. The system of claim 7, wherein the processor is configured to initiate executable operations further comprising:

responsive to the determining that the classification of the electronic message contradicts the user-specified pre-fetch preferences, retraining the machine learning model using the feature vector of the electronic message.

9. The system of claim 7, wherein the processor is configured to initiate executable operations further comprising:

determining whether a sufficient number of electronic messages have been processed for purposes of training the machine learning model; and in response to determining that the sufficient number of electronic messages have been processed for purposes of training the machine learning model, training the machine learning model to perform electronic message pre-fetch processing.

10. The system of claim 7, wherein the processor is configured to initiate executable operations further comprising:

generating a unique hashed value representing the universal resource locator; and representing the universal resource locator in the feature vector using the unique hashed value.

11. A computer program product comprising a computer readable storage medium having program instructions embodied therewith, wherein the computer readable storage medium is not a transitory, propagating signal per se, the program instructions executable by a processor to cause the processor to initiate executable operations comprising:

determining metadata for an electronic message directed to a user;

detecting a universal resource locator within a body portion of the electronic message;

determining a content type for the universal resource locator;

performing natural language processing on the electronic message to determine an action importance corresponding to universal resource locator, determining the action importance corresponding to the universal resource locator comprising detecting an action term within text of the electronic message that is distinct from the universal resource locator and mapping that action term being an action verb and the action importance comprising an auxiliary verb indicating an importance of the action verb;

generating a feature vector specifying the metadata for the electronic message, the content type of the universal resource locator and the action importance;

determining a classification of the electronic message using a machine learning model, the classification indicating whether content referenced by the universal resource locator should be pre-fetched;

determining whether the classification of the electronic message contradicts user-specified pre-fetch preferences;

responsive to determining that the classification of the electronic message contradicts the user-specified pre-fetch preferences, determining, based on the user-specified pre-fetch preferences, whether to determine whether to pre-fetch the content referenced by the universal resource locator in accordance with the classification of the electronic message or in accordance with the user-specified preferences;

responsive to determining whether to pre-fetch the content referenced by the universal resource locator in accordance with the classification of the electronic message, responsive to comparing the content type for the universal resource locator corresponding to the action importance with the classification of the electronic message, and responsive to classification of the electronic message indicating that universal resource locators corresponding to the action importance and with that content type are to be pre-fetched, pre-fetching at least a portion of content specified by the universal resource locator from a data processing system based on the metadata, pre-fetching the at least a portion of the content comprising retrieving the at least a portion of the content prior to the electronic message being provided to the user; and providing the electronic message and the at least a portion of the content to a client device of the user.

12. The method of claim 1, further comprising:

responsive to determining whether to pre-fetch the content referenced by the universal resource locator in accordance with the user-specified pre-fetch preferences, responsive to comparing the content type for the universal resource locator corresponding to the action importance with the pre-fetch preferences of the user, and responsive to the pre-fetch preferences of the user indicating that universal resource locators corresponding to the action importance and with that content type are to be pre-fetched, pre-fetching, using the computer hardware, at least a portion of content specified by the universal resource locator from a data processing system based on the metadata, pre-fetching the at least a portion of the content comprising retrieving the at least a portion of the content prior to the electronic message being provided to the user.

13. The method of claim 1, further comprising:

determining that the content type for the universal resource locator is not specified; and responsive to determining that the content type for the universal resource locator is not specified, querying the user for a new category of content type and pre-fetch preferences corresponding to the new category;

wherein the determining, using the computer hardware, the content type for the universal resource locator comprises determining the content type for the universal resource locator according to the new category of content type.

14. The method of claim 1, further comprising:

receiving a user input modifying the user-specified pre-fetch preferences; and responsive to determining that the classification of the electronic message contradicts the user-specified pre-fetch preferences and responsive to receiving the user input modifying the user-specified pre-fetch preferences, maintaining a current state of the machine learning model.

15. The system of claim 7, wherein the processor is configured to initiate executable operations further comprising:
responsive to determining whether to pre-fetch the content referenced by the universal resource locator in accordance with the user-specified pre-fetch preferences, responsive to comparing the content type for the universal resource locator corresponding to the action importance with the pre-fetch preferences of the user, and responsive to the pre-fetch preferences of the user indicating that universal resource locators corresponding to the action importance and with that content type are to be pre-fetched, pre-fetching at least a portion of content specified by the universal resource locator from a data processing system based on the metadata, pre-fetching the at least a portion of the content comprising retrieving the at least a portion of the content prior to the electronic message being provided to the user.

16. The system of claim 7, wherein the processor is configured to initiate executable operations further comprising:
determining that the content type for the universal resource locator is not specified; and
responsive to determining that the content type for the universal resource locator is not specified, querying the user for a new category of content type and pre-fetch preferences corresponding to the new category;
wherein the determining, using the computer hardware, the content type for the universal resource locator comprises determining the content type for the universal resource locator according to the new category of content type.

17. The system of claim 7, wherein the processor is configured to initiate executable operations further comprising:
receiving a user input modifying the user-specified pre-fetch preferences; and
responsive to determining that the classification of the electronic message contradicts the user-specified pre-fetch preferences and responsive to receiving the user input modifying the user-specified pre-fetch preferences, maintaining a current state of the machine learning model.

18. The computer program product of claim 11, wherein the executable operations further comprise:
responsive to determining whether to pre-fetch the content referenced by the universal resource locator in accordance with the user-specified pre-fetch preferences, responsive to comparing the content type for the universal resource locator corresponding to the action importance with the pre-fetch preferences of the user, and responsive to the pre-fetch preferences of the user indicating that universal resource locators corresponding to the action importance and with that content type are to be pre-fetched, pre-fetching at least a portion of content specified by the universal resource locator from a data processing system based on the metadata, pre-fetching the at least a portion of the content comprising retrieving the at least a portion of the content prior to the electronic message being provided to the user.

19. The computer program product of claim 11, wherein the executable operations further comprise:
determining that the content type for the universal resource locator is not specified; and
responsive to determining that the content type for the universal resource locator is not specified, querying the user for a new category of content type and pre-fetch preferences corresponding to the new category;
wherein the determining, using the computer hardware, the content type for the universal resource locator comprises determining the content type for the universal resource locator according to the new category of content type.

20. The computer program product of claim 11, wherein the executable operations further comprise:
receiving a user input modifying the user-specified pre-fetch preferences; and
responsive to determining that the classification of the electronic message contradicts the user-specified pre-fetch preferences and responsive to receiving the user input modifying the user-specified pre-fetch preferences, maintaining a current state of the machine learning model.

* * * * *